United States Patent [19]

Taylor

[11] 4,327,708
[45] May 4, 1982

[54] SOLAR SIDING FOR BUILDINGS

[76] Inventor: Don A. Taylor, 216 Mill St., Wadsworth, Ohio 44281

[21] Appl. No.: 57,508

[22] Filed: Jul. 16, 1979

[51] Int. Cl.³ .............................................. F24J 3/02
[52] U.S. Cl. .................................. 126/429; 126/431; 126/449; 126/448; 126/DIG. 2; 52/531
[58] Field of Search ............... 126/DIG. 2, 429, 428, 126/417, 449, 432, 430, 436, 437, 400; 52/531, 533, 534, 557; 29/157.3 R

[56] References Cited

U.S. PATENT DOCUMENTS

| | | | |
|---|---|---|---|
| 246,626 | 9/1881 | Morse | 126/432 |
| 1,369,806 | 3/1921 | Hanmer | 29/157.3 R |
| 2,656,158 | 10/1953 | Hodson et al. | 29/157.3 R |
| 2,766,861 | 10/1956 | Abramson | 52/531 |
| 2,931,578 | 4/1960 | Thompson | 126/429 |
| 4,068,652 | 1/1978 | Worthington | 126/431 |
| 4,069,809 | 1/1978 | Strand | 126/431 |
| 4,111,188 | 9/1978 | Murphy, Jr. | 126/DIG. 2 |
| 4,111,359 | 9/1978 | Trombe et al. | 126/430 |
| 4,127,103 | 11/1978 | Klank et al. | 126/432 |
| 4,184,476 | 1/1980 | McArthur | 126/431 |
| 4,203,424 | 5/1980 | Coxon et al. | 126/430 |
| 4,212,289 | 7/1980 | Hebert | 126/430 |
| 4,271,819 | 6/1981 | Farrell | 126/448 X |

*Primary Examiner*—Samuel Scott
*Assistant Examiner*—Randall L. Green

*Attorney, Agent, or Firm*—John Harrow Leonard

[57] ABSTRACT

Solar siding elements of very thin, high heat conductive sheet material are installed on the outer face of an exterior side wall of a building so as to form thereon a solar cover providing a plurality of passages between its inner face and the outer surface of the building wall. Air is caused to flow, by forced draft or convection, through the passages in intimate heat exchange contact with the interior surface of the solar cover, and thereby become heated. The air is constrained to enter the passages through an inlet manifold and to be discharged from the passages through an outlet manifold. For heating the building, the heated air from the outlet manifold may be discharged into the building, or into a heat sink for storing the solar generated heat, and increasing the air temperature before discharging the air into the building. In the latter case, the air may be passed once through the sink and into the building or recycled repeatedly back into the inlet manifold and through the passages and sink for accumulating more heat in the air and storage sink before discharging the air into the building. To reduce the temperature of the side wall of the building in hot weather, the heat normally absorbed by the air stream passing through the passages is discharged by discharging the heated air from the outlet manifold directly into the atmosphere, whereby the solar load on the wall is reduced, resulting in a reduction of air conditioning energy requirements.

9 Claims, 23 Drawing Figures

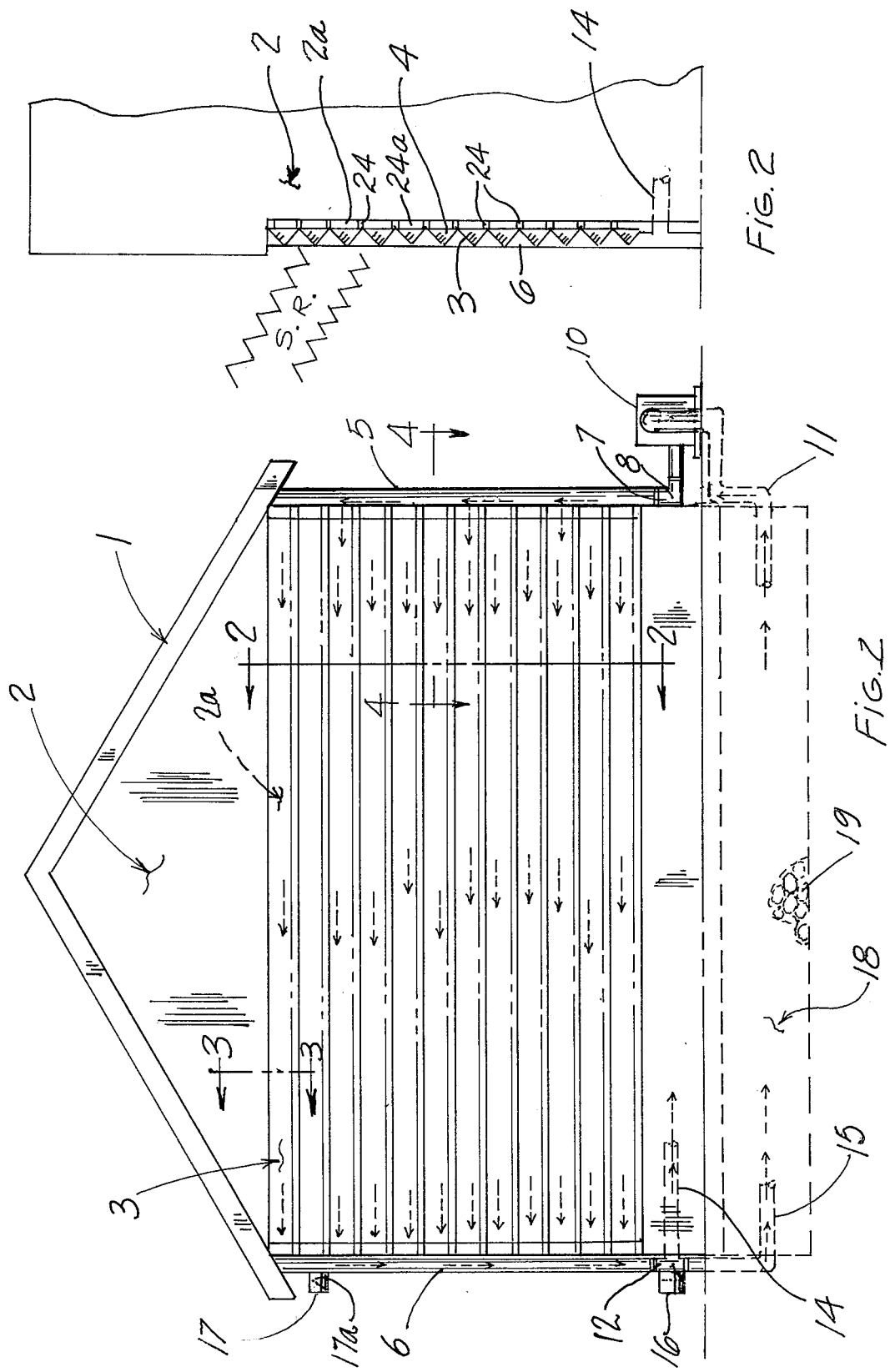

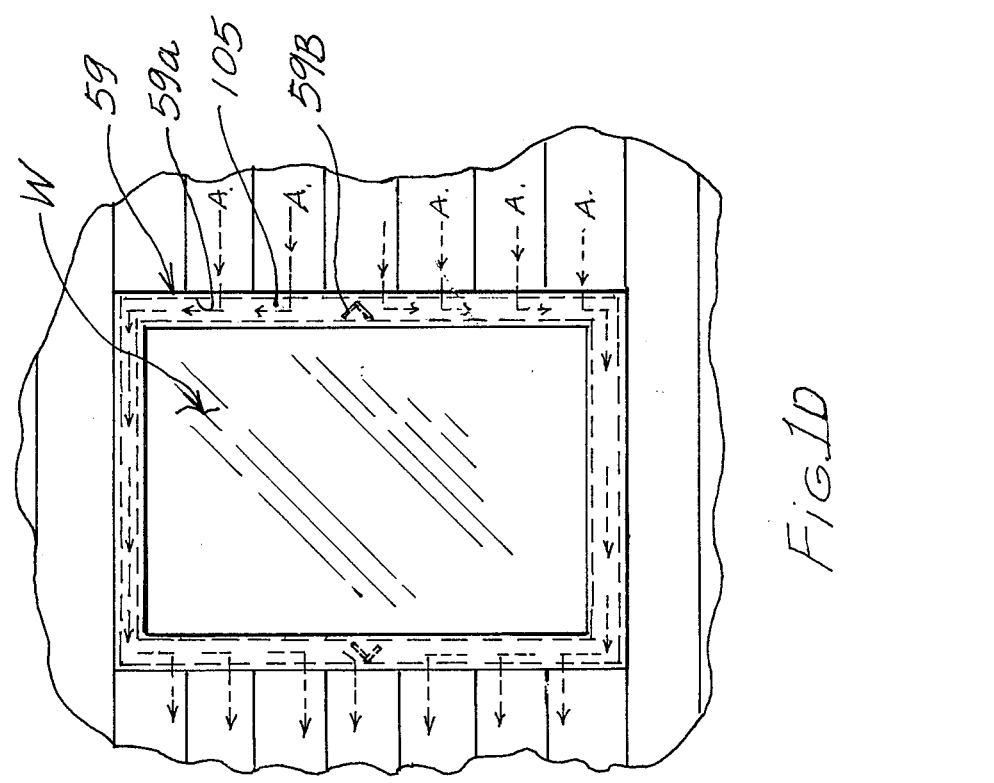
Fig. 1D
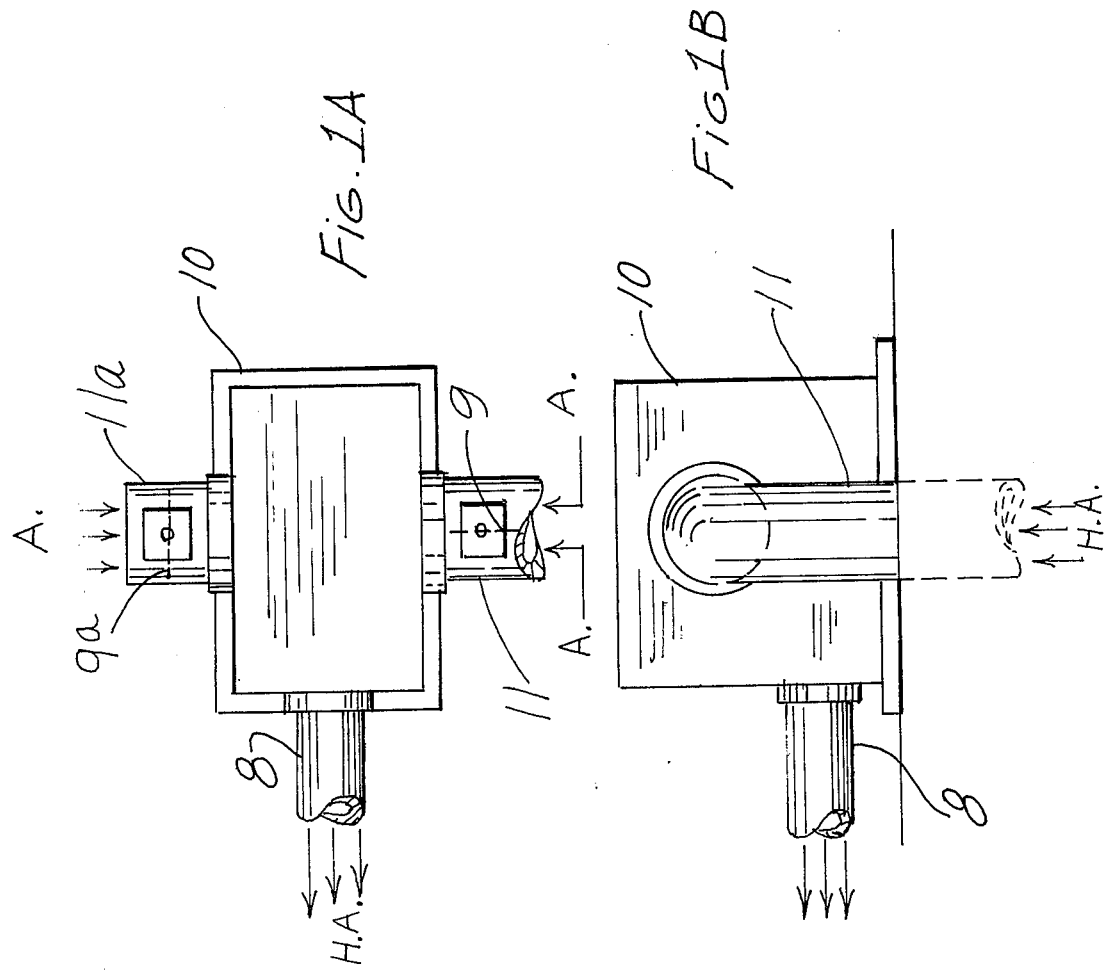
Fig. 1A
Fig. 1B

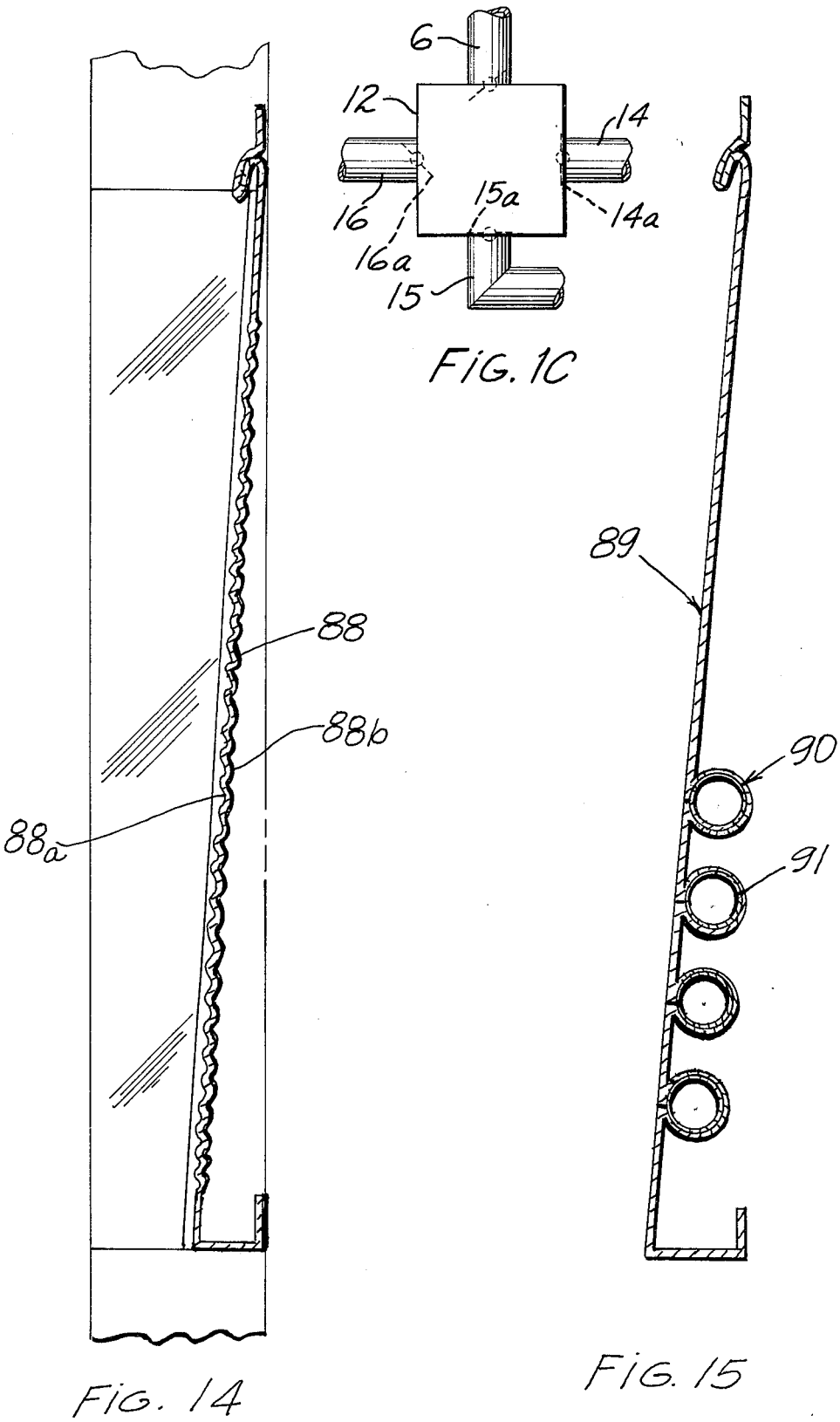

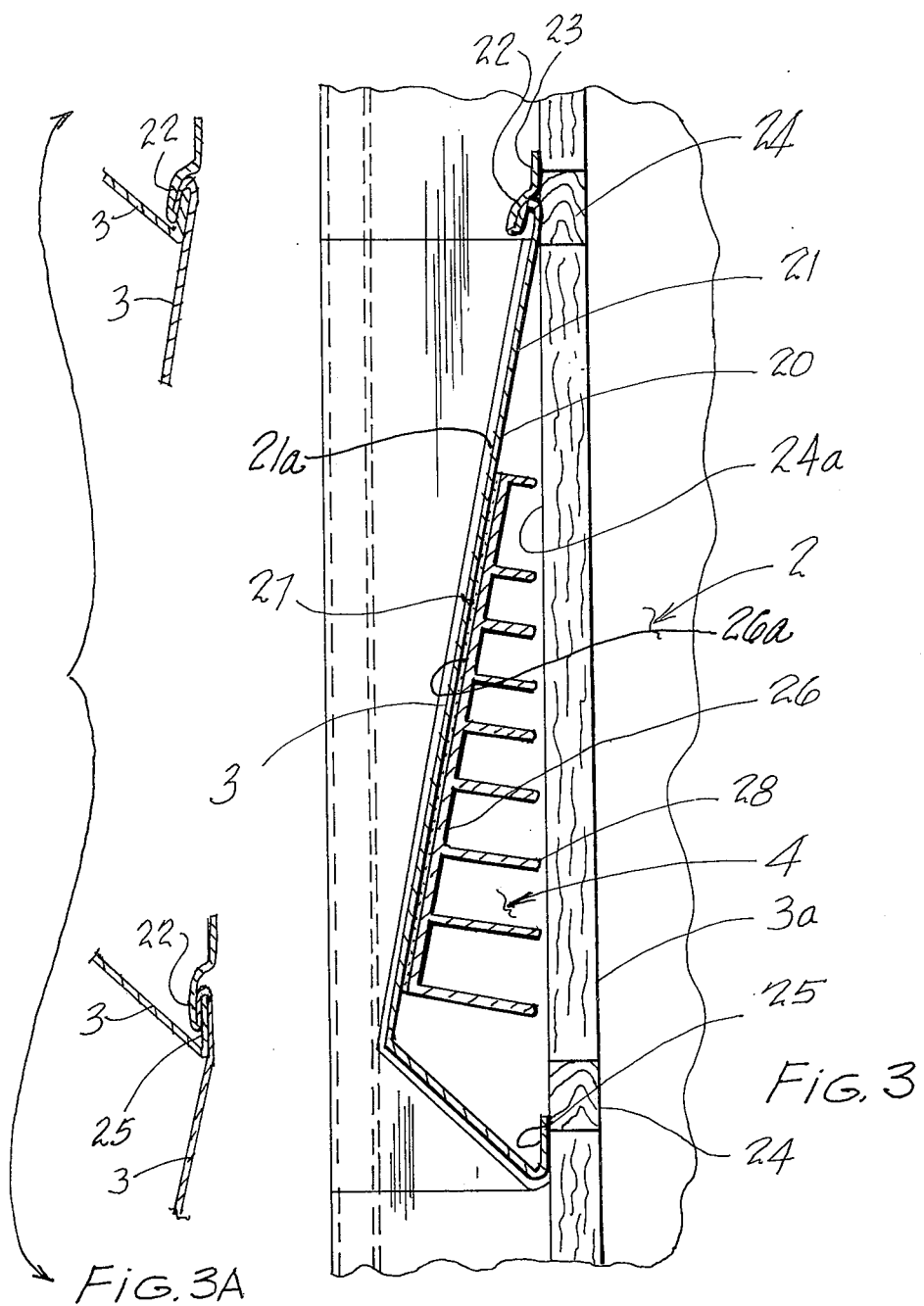
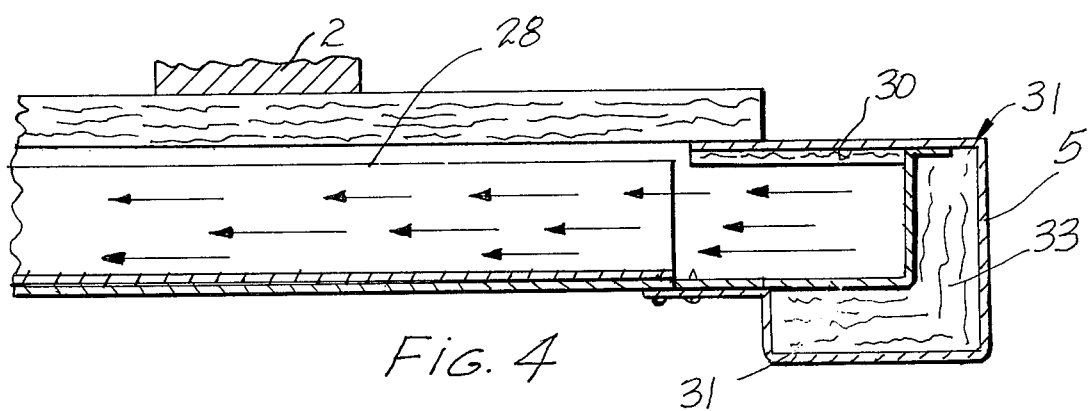

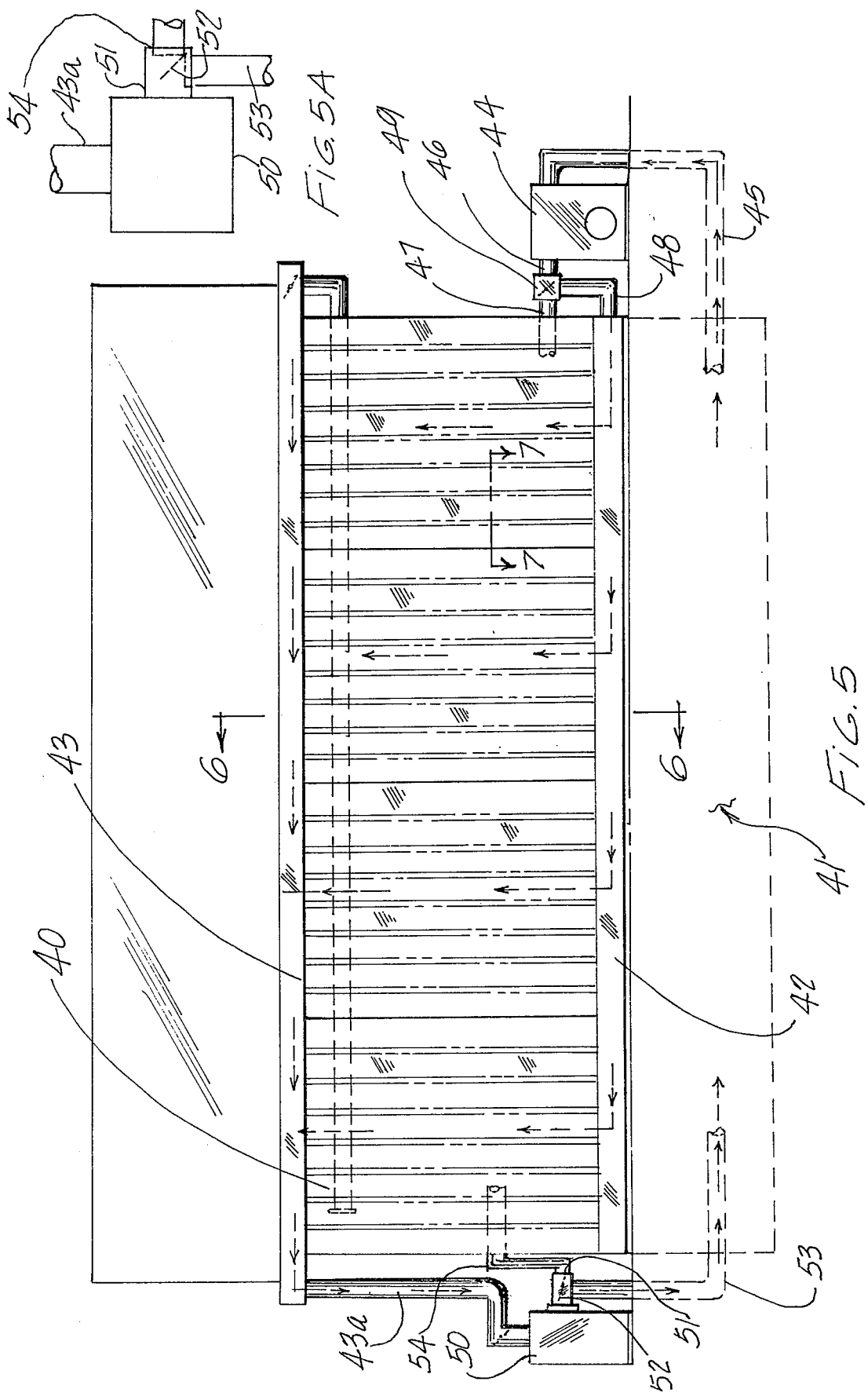

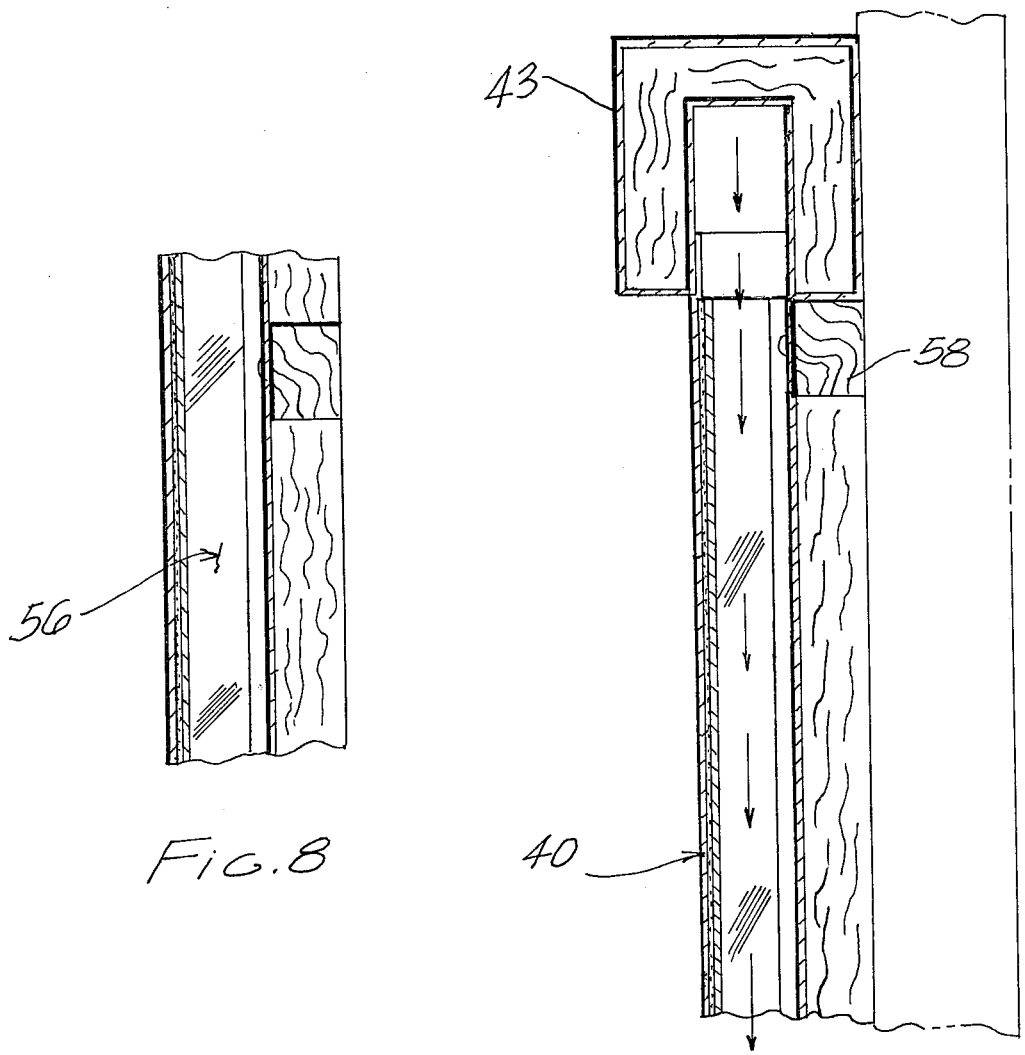
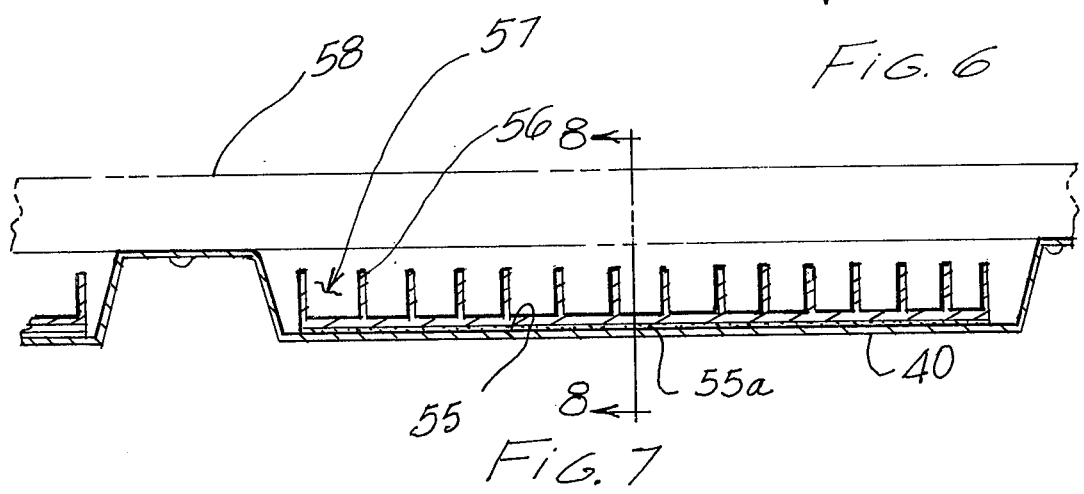

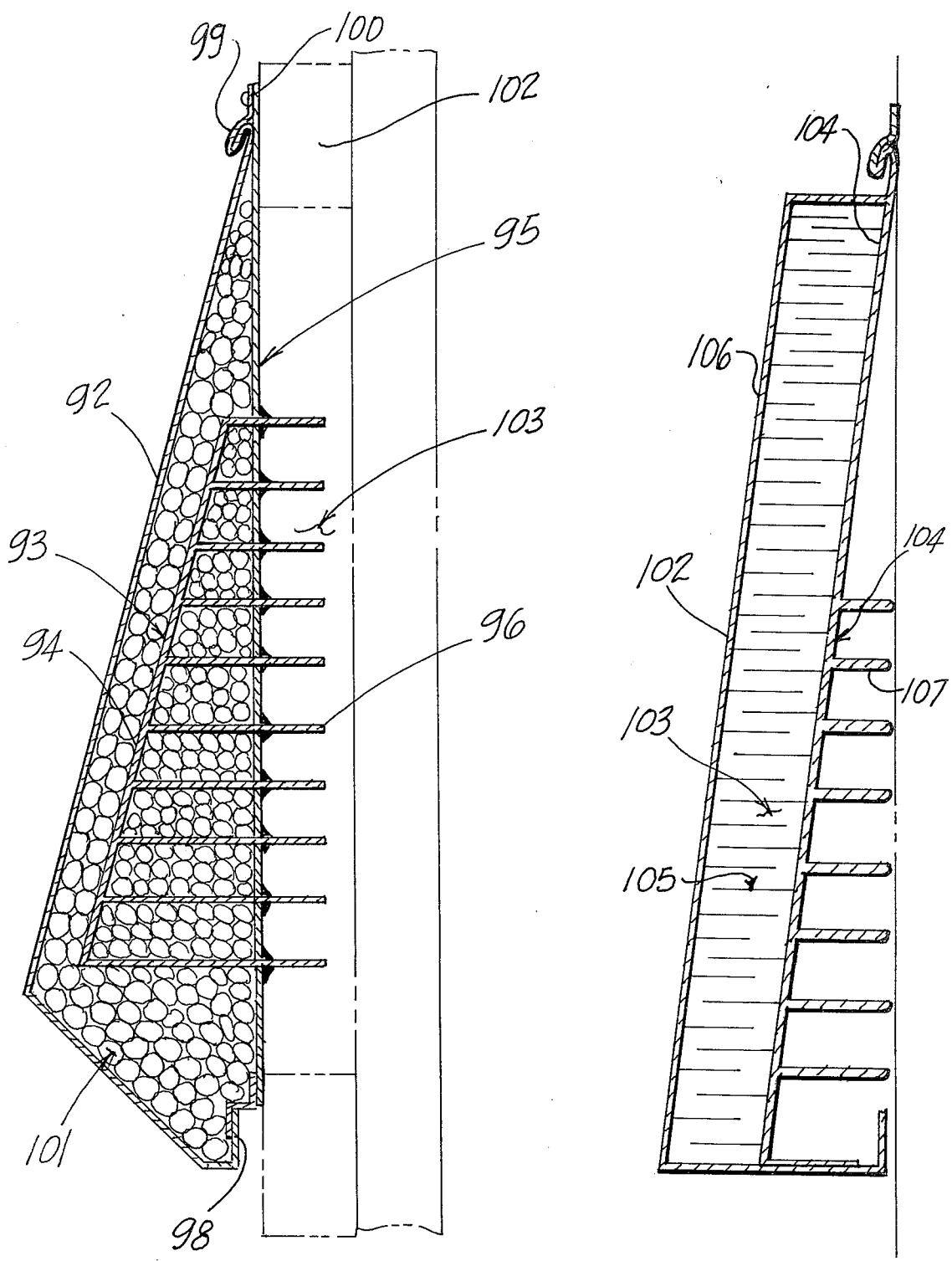

SOLAR SIDING FOR BUILDINGS

BACKGROUND OF INVENTION

1. Field of Invention

Solar heating and air conditioning, and solar siding elements therefor.

2. Prior Art

In the home building field, relatively low cost, single thickness strips of wood or sheet metal, known to the trade as siding, have been nailed or otherwise fastened to the exterior walls of buildings, a common form being known as lap siding. Generally, such siding is to protect the building structure from the elements, eliminate painting, and improve the aesthetics of the building.

Heretofore, various solar radiation collecting devices have been devised for buildings, but these have not found broad application mainly due to their excessive initial cost and to the direct and indirect costs of installation.

One such device is known as a solar panel, assemblies of which are maintained in proper oriented fixed position relative to the sun, usually by mounting the panels on building roofs in positions to receive solar radiation. Such solar panels have a number of disadvantages. They are generally arranged in flat areas on the roof and thus retain snow, ice, and the like, which decrease their efficiency and further introduce dangers of breakage or collapse under the snow load or heavy winds. Also they are very subject to displacement in their entirety by heavy winds. Further, the exposure areas are limited. Since the efficiency of solar thermal transfer diminishes in relation to the difference of the collector temperature and the temperature of the ambient air, the panel systems, due to the limited areas exposed to solar radiation because of the limited areas for southern orientation and exposure, must generate exceedingly high temperatures to attain good solar efficiency.

Another type of solar device is the dual glazed window, but the heat loss through these, after the sunshine hours, is excessive.

Most of these prior solar devices are mounted for a southern exposure only, and thus utilize the solar radiation impinging on only a limited part of the house, and then only for a limited part of the day.

Again, many of the prior devices present problems in compliance with existing building codes, due not only to the structural changes in buildings required for their installation and support, but also from the aesthetic standpoint.

Another prior device is the self-contained solar heat collecting unit detached from the house, but these generally are complex and expensive, requiring not only numerous controls for effective operation, but also expensive servicing and provisions for their own protection against winter freezing.

Prior passive solar systems, known as natural systems, use a mass of masonary material to receive and absorb solar radiation, but these materials generally have low specific heat and low conductivity, and hence introduce a thermal time lag and inefficiency, both in absorbing and re-emitting heat, with the resultant severe fluctuations in the building temperature. Further, they cannot be programmed readily for ranges from high daytime temperatures to low night temperatures.

SUMMARY

The present invention is directed to the provision of special solar siding elements which are so shaped and arranged that they can be installed readily on new building walls or over existing conventional siding on old walls in the same manner as conventional siding to provide a solar cover. These solar elements interlock with each other in such a manner that they provide a continuous solar cover of the outer surface of the building side wall for exposure to the sun, yet define between their inner faces and the outer face of the building side wall a plurality of air passages which, in most instances, extend either horizontally for the width of the side wall, or vertically for the height of the side wall. The passages may extend diagonally of the side wall, if desired. These passages, at their opposite ends, are connected to inlet and outlet manifolds, respectively. The manifolds have openings corresponding in size and shape to the cross sections of the passages. In the case of horizontal siding elements, the manifolds are upright and arranged at opposite margins of the wall. In the case of vertical siding elements, the manifolds are horizontal and are arranged at top and bottom, respectively, of the building side wall.

The resultant solar cover has the appearance of conventional siding and does not deleteriously affect the appearance of the building. The upright manifolds have the appearance of conventional water conveying drainage downspouts or corner columns, making them aesthetically acceptable.

Regardless of whether vertical or horizontal manifolds are used, that manifold at one end of the same passage is arranged for introduction of air, or other heat absorbing fluid that may be desired, concurrently to all of the passages of the associated siding elements. The other associated manifold is similarly arranged, but to receive the air or fluid discharged from the passages and to conduct it to locations selected. The circulation of the air may be by forced draft or by natural convection.

Suitable ducts containing conventional control dampers or electric valves are connected to the manifolds and are arranged so that cold outside air or warm recirculated air from a heat storage sink can be admitted through the inlet manifold, selectively, and so that the air from the outlet manifold can be discharged, selectively, into the heat storage sink, or into the interior of the building, either directly or by introduction into the existing conventional forced warm air circulating system, or can be recirculated repeatedly through the passages and the heat storage sink so as to accumulate a larger reserve of heat before the heated air is discharged into the building.

Also air from the outlet manifold can be discharged into the atmosphere, whereby the normal heat penetration of the building walls, caused by solar radiation, is carried away and discharged into the atmosphere, thereby reducing the solar load on the building.

The surface areas of the solar side elements are increased on one or both faces by surface texturing and multiple angles. The surface areas on the inner side of the solar elements is increased by interior fins, and as otherwise herein disclosed. These features augment the efficiency of the heat exchange relation between the fluid medium flowing through the passages and the solar siding elements.

A major advantage of the present invention is its greatly reduced cost and savings compared to prior solar systems. These result from the facts that production of the present solar siding elements is directly relatable to the manufacturing tool, production machinery, materials, and manufacturing techniques, of conventional siding.

Another advantage is that the present solar siding elements can be installed readily and rapidly in the same manner as conventional siding by the usual artisans and at a comparable low cost, so as to cover new planar building side walls and also side walls already covered with lap siding, metal siding, or plastic, all without deleterious effects on the aesthetic appearance of the building.

Again, the solar siding elements can be installed to provide covers for any or all walls of the building, and thus can provide a much larger solar exposure area in relation to building size than do prior solar systems. This increase in solar exposure area results in an overall increase of solar heating efficiency. It also represents a solution to the problem posed by the necessity for a fixed southern location of radiation collecting panels and the resultant necessity of the building layouts to provide the optimum specific orientation. Further, it allows for a lower temperature heat collection system which increases the solar efficiency of the system.

Another advantage is that the resultant solar cover also increases the R-insulating value of the walls of the building, as to heat normally escaping through the building walls and their insulation from within a building is intercepted by the air in the passages and returned into the air circulating system of the building.

The foregoing advantages, including low cost and very efficient energy saving, are conducive to widespread adoption of solar air conditioning for both residential and commercial buildings.

Various other objects and advantages will become apparent from the following description in which reference is made to the drawings.

BRIEF DESCRIPTION OF THE DRAWINGS

FIG. 1 is a side elevation of a building with a solar cover embodying the principles of the present invention installed on a side wall thereof;

FIG. 1A is an enlarged diagrammatic plan view of an air circulating pump indicated in FIG. 1;

FIG. 1B is a side elevation of the pump illustrated in FIG. 1A;

FIG. 1C is an enlarged diagrammatic side elevation of a damper control chamber illustrated in FIG. 1;

FIG. 1D is a front view of building wall with a window, and solar cover, illustrating the air flow around and in by-pass relation to the window casement in the wall;

FIG. 2 is a diagrammatic vertical sectional view of the wall and solar cover illustrated in FIG. 1, and is taken on the line 2—2 of FIG. 1;

FIG. 3 is an enlarged fragmentary sectional view of a portion of the side wall of FIG. 1, taken on line 3—3 thereof, and illustrating in greater detail one of the solar siding elements used for forming the solar cover;

FIG. 3A is a fragmentary sectional view of two of the solar siding elements of FIG. 3, illustrating the relations of the mutually interlocking and fastening tabs and fins of adjacent solar elements;

FIG. 4 is an enlarged fragmentary horizontal sectional view of the side wall and solar cover of FIG. 1, taken on the line 4—4 thereof, and showing an intake manifold for the solar siding elements;

FIG. 5 is a front elevation of a building illustrating a modification of the invention in which the solar siding elements are disposed so that the air passages are vertical, instead of horizontal;

FIG. 5A is an enlarged diagrammatic front elevation of a pump and damper chamber indicated in FIG. 5;

FIG. 6 is an enlarged fragmentary vertical sectional view of a portion of the side wall and solar siding elements of FIG. 5, and is taken on the line 6—6 of FIG. 5;

FIG. 7 is an enlarged horizontal sectional view, taken on the line 7—7 of FIG. 5;

FIG. 8 is a fragmentary vertical sectional view taken on the line 8—8 of FIG. 7;

FIG. 14 is a view similar to FIG. 13 illustrating another modification of a solar siding element in which tubing is provided so that water or a thermal liquid solution can be used as the medium for absorbing heat from the siding element;

FIG. 15 is a view similar to FIG. 13 illustrating another modification in which tubes for heating a fluid medium are attached to the siding element;

FIG. 16 is a view, similar to FIG. 13, illustrating another modification in which a heat storage sink is incorporated in the solar element itself; and FIG. 17 is a view, similar to FIG. 13, illustrating a solar siding element incorporating a heat sink in the form of a sealed container for liquid media for storing and conducting heat.

Figure 9:
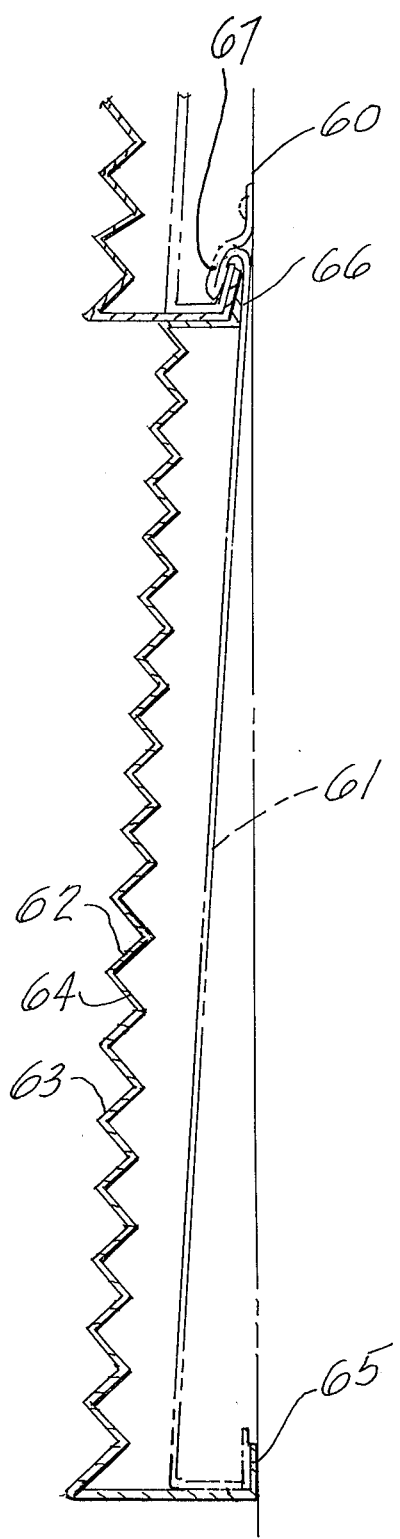
FIG. 9 is an enlarged fragmentary vertical sectional view of a portion of a wall of a building with a modified form of solar siding elements installed thereon.

Referring first to FIGS. 1 through 3, a building 1 is shown as having an outer side wall, generally designated 2, which may be conventional. The wall 2 has an outer face 2a on which solar siding elements 3 of the present invention are arranged to form a solar cover with its inner face spaced from the outer face 2a of the wall 2 so as to provide passages 4 for air or other fluid media between the cover and wall 2. The ends of the solar siding elements 3, at one end of the wall 2, are connected to a suitable inlet manifold 5. At the other end of the wall, the solar siding elements 3 are connected to an outlet manifold 6. These manifolds have openings conforming to the open ends of the passages 4, respectively. The end walls of the siding elements 3 are in sealed relation at their peripheries to the peripheries of the openings of the manifold 5 so that air entering the manifold 5 is constrained to flow into and through the passages 4, respectively. The opposite ends of the solar siding element 3 are connected in like manner to the outlet manifold 6 which receives the air passed through the passages 4.

Referring to FIGS. 1, 1A and 1B, the manifold 5 has an inlet 7 which is connected by a connecting duct 8 to the manifold 5. Admission of air to the duct 8, controlled by inlet control means including dampers 9 and 9a, later to be described and as illustrated in FIGS. 1A and 1B, preferably is from a pump 10 having inlets 11 and 11a, respectively. The pump 10 is of a type wherein air can enter the inlets 11 and 11a and pass to the duct 8 whether or not the pump is being driven.

As indicated in FIGS. 1A and 1B, the damper 9 is conventional, being essentially a simple plate which can be rotated about its diameter to open and close the inlet 11. The damper 9a may be of the same type and operable to open and close the inlet 11a. The dampers can be set independently of each other. With the damper 9 in open position and the damper 9a in closed position, air enters the inlet 11 only. With the damper 9 in closed position and the damper 9a in open position, air enters the inlet 11a only. With both dampers partially open, a desired mixture of air through both the inlets 11 and 11a can be obtained.

As illustrated, the inlet 11 may be connected to a heat sink, as later described, and the inlet 11a may be connected to the atmosphere within or outside of the building. As mentioned, the air may be forced through the pump chamber by the pump or drawn therethrough by convection.

As illustrated in FIG. 1C, the outlet manifold 6 is connected to an outlet control means including a damper chamber 12 having outlet ducts 14, 15, and 16, which are independently controlled by conventional dampers 14a, 15a, and 16a, respectively. The dampers 14a, 15a, and 16a may be independently settable or may be settable remotely from a central station. An auxiliary outlet duct 17 may be provided at the upper end of the outlet manifold 6 for permitting the air to exhaust readily to the atmosphere from the outlet manifold 6 by convection. The outlet 17 is controlled by a conventional damper 17a.

If a heat sink is desired for heat storage, such can be provided by a container 18 filled with rocks 19, or with a liquid or other heat absorbing medium.

The duct 14 may be arranged to discharge directly into the building or into the inlet of the normal furnace air circulating system thereof. The duct 15 may be arranged to discharge into the sink 18 for recirculation of the heated air for increasing the temperature of the sink and of the recirculated air. The duct 16 is arranged to discharge directly to the atmosphere outside of the building. The damper system may be arranged so as to deliver part of the air through the duct 14 and part into the sink 18 through the duct 15.

The dampers can be set in relation to each other to cause the air from the manifold 6 to discharge through the duct 14 into the building, either directly or through the existing furnace forced air system, or through the duct 15 into the heat sink 18 from which it can be passed into the building or into the inlet manifold for recirculation through the passages 4, or through the duct 16 directly into the atmosphere outside of the building.

For example, by closing dampers 15a, and 16a, and opening damper 14a, the air is delivered directly into the building. By closing dampers 14a and 16a and opening damper 15a, the air is delivered to the heat sink 18. By closing dampers 14a and 15a, and opening damper 16a, the air is discharged directly into the atmosphere. This latter setting is particularly desirable in summer for sweeping heated air from the passages 4 and thus reducing the external heat load on the wall 2.

The auxiliary outlet duct 17, if provided, is also controlled by a damper 17a. This feature is especially desirable in extremely hot weather, as the higher elevation of the outlet duct 17 is conducive to maximum flow of air by convection currents resulting from the high ambient temperatures within the manifolds 5 and 6 and passages 4. If the discharge from the manifold 6 is to be by way of the damper chamber 12, the damper 17a is closed.

In general, these dampers can be set individually or from a remote control panel, to provide desired intermediate mixtures and proportions of outside air, recycled air, and the like.

Referring to the structure of the solar siding elements 3 more in detail, especially as shown in FIGS. 3, 3a, and 4, each siding element 3 may comprise an individual solar unit, indicated generally at 20, in the form of a piece of sheet metal 21, or other heat conducting sheet material such as plastic impregnated with metallic powder. Aluminum is the preferred metal due to its high thermal conductivity.

The sheet 21 has a show portion or outer face 21a between its upper and lower margins. Its upper margin is formed to provide a downwardly opening hook 22, with an upper free tab portion extending upwardly from the hook 22 to provide a nailing tab 23.

For purposes of illustration, as indicated in FIG. 3, the wall 2 is shown as provided with furring strips 24 and insulating board 24a filling the spaces between the strips 24. This arrangement is preferred as it prevents loss of heat from the interior of the building through the wall 2 in winter and reduces the external heat entering the building through the wall 2 in summer. Such a structure is conventional and the outer surface of the strips 24 and board 24a are considered the outer face of the wall 2 to which the solar elements 3 are attached. However, the solar siding elements 3 may be fastened directly to said wall 2 without such insulating preparation.

In installation shown in FIG. 3, the tab portions 23 are juxtaposed against and nailed to the furring strips 24. The strips 24, if used, may extend horizontally, as shown in FIG. 3, or vertically, as shown in FIG. 6. The lower margin of each solar siding element 3 is in the form of an upwardly opening rear hook portion 25 which is shaped to interfit snugly with the downwardly opening hook portion 22 at the upper edge of an immediately adjacent siding element 3 therebeneath, so as to hold each solar siding element 3 in substantially sealed relation with siding elements 3 adjacent to it at its upper and lower edges, respectively, thereby to provide a continuous sealed solar cover which covers the wall 2. The outer face of the siding element 3 or sheet metal 21, shown in FIG. 3, is a show area 21a which may be smooth and painted, preferably in a dark color for greater absorption of solar heat. It may be rough textured, both exteriorly and interiorly, if desired, and also unpainted.

Due to the angularity of the show areas 21a of each solar siding element 3 relative to the vertical, the area 21a receives the sun rays more directly than were the area 21a vertical, thus increasing the efficiency of solar heating.

In order to enhance or increase the heating of the air passing through the passages 4, a heat exchange augmenting component 26 may be provided. The component 26 also may be of metal or of a plastic impregnated with metallic powder, or may be of any high heat conducting and exchange material.

The component 26 has an outer face portion 26a which can be juxtaposed directly against the inner face of the associated siding element 3, but since there may be some irregularities in the inner surface of the solar siding element 3, or in the component 26, which could reduce the area of contact, the component 26 may be joined to the inner face of the siding element 3 by the interposition of a high heat conducting metallic compound 27 which renders the forward face of the componet 26 and the inner face of the siding 3 substantially integral. This bonding of the component 26 to the inner face of the solar siding element 3, as mentioned, increases the effective heat exchange surfaces of the component 26 and siding element 3.

The component 26 may be provided with a plurality of fins 28 which extend rearwardly from its inner face and which may terminate close to the front of the wall 2, as prepared in the illustrative examole with furring strips 24 and insulation board 24a. These fins 28 serve the dual purpose of providing greater heat exchange area exposed to air passing through the passages 4, and also of increasing the rigidity of the associated solar siding elements 3 on which the components 26 are installed.

The inlet manifold 5, and also the outlet manifold 6, preferably are in two parts, including an inner duct portion 30 which receives the ends of the solar side elements 3 and opens into the ends of the passsages 4, and an outer sheathing 31 which acts as a weather guard and maintains insulation 33 in surrounding relation to the inner duct 30, thus conserving the heat.

With this structure, the heat generated by solar radiation is passed into air flowing through the passages 4 between the outer solar cover and the wall 2. The air thus heated can be discharged into the atmosphere, and thereby, during the summer, reduce the temperature of the inner wall relative to what it would be were it directly impinged upon by the solar radiation. Further, as mentioned, the structure not only admits the selective discharge of the heated air from the passages 4 to the atmosphere in summer, but also, in winter, when higher temperatures are desired, admits such air directly into the building, or into the heat storage sink from which it passes to the inlet air manifold for recycling before passing into the building.

Referring next to FIG. 5, a modification is illustrated in which solar siding elements 40 are provided and are arranged vertically. These solar siding elements 40 may be the same as those in FIGS. 1 through 4, but preferably are trapezoidal in horizontal cross section, as illustrated in FIGS. 5 through 7. In this form, a heat sink 41 also is provided. An inlet manifold 42 is arranged horizontally at the bottom of the solar siding elements 40 and an outlet maniflold 43 is arranged horizontally at the top. An air pump or blower 44 is provided with an inlet duct 45 which is connected with the heat sink 41 for withdrawing air from the sink 41 and directing it through an outlet duct 46. The duct 46 has one branch 47 which discharges directly into the building and has another branch 48 which is connected to the inlet manifold 42 for recirculating the heated air from the sink 41.

A suitable damper chamber 49, with conventional dampers, as above described in connection with FIGS. 1 through 4, is provided for directing the air, as desired, in the manner heretofore disclosed. The outlet manifold 43 is connected by a vertical duct 43a to a pump 50. The pump 50 discharges into a damper chamber 51 in which a damper 52 is provided for directing the air from the duct 43a into an inlet duct 53 which conducts the air from the duct 43a into the sink 41 or, if desired, for directing the air through a duct 54 which discharges into the furnace air duct system of the building. As in connection with the solar siding elements 3 in FIG. 3, each of the upright trapezoidal solar siding elements 40 may also be provided with a heat collecting and radiating component 55 which is bonded fixedly to the inside face of the element 40 by a layer of suitable high heat conducting compound, as indicated at 55a. The component 55 also may be provided with heat radiating and stiffening fins 56. The elements 40 may be shaped so that their lateral margins may be juxtaposed against the building side wall or furring strips, indicated diagrammatically at 58 in FIG. 7, and overlapped, one margin of each siding element with that of an adjacent siding element. If desired, a number of siding elements 40 may be formed integral with each other from a single sheet of material. In either form, the siding elements 40 define air passages 57 leading from the manifold 42 to the manifold 43.

If, as shown in FIG. 1D, a wall has windows W, the passages 4 at the window level would be blocked and the flow of air therethrough prevented. To eliminate this blockage, the window is provided with a casement 59 which has channel portions 59a and deflectors 59b which provide manifolds or passages into which the intersecting passages 4 discharge, and which convey the air therefrom around the casement and into the portions of the passages 4 at the opposite side of the casement.

Referring to FIG. 9, another modification is shown, and is mounted on a wall 60 which is already covered with the conventional lap siding, indicated diagrammatically at 61. In this structure, each of the present solar siding elements, indicated at 62, may be in the form illustrated in FIG. 3 or in the form of a piece of sheet metal which is open pleated or corrugated, as indicated at 63 and 64, to provide greater surface area. Due to this shape, instead of a plane show surface, each element 62 has a plurality of show surfaces which can be of such desired shape and size as necessary for the most effective exposure to the sun. The solar siding element 62 is provided at its lower margin with a flange 65 which can be forced up under the normal wood or aluminum lap siding, and has an upper flange 66 which can be inserted into the hook portion 67 of an adjacent like siding element 62 thereabove, such as the flange portion 22 of siding element 3 of FIG. 3, which is adapted for like installation over existing lap siding.

Figure 10:
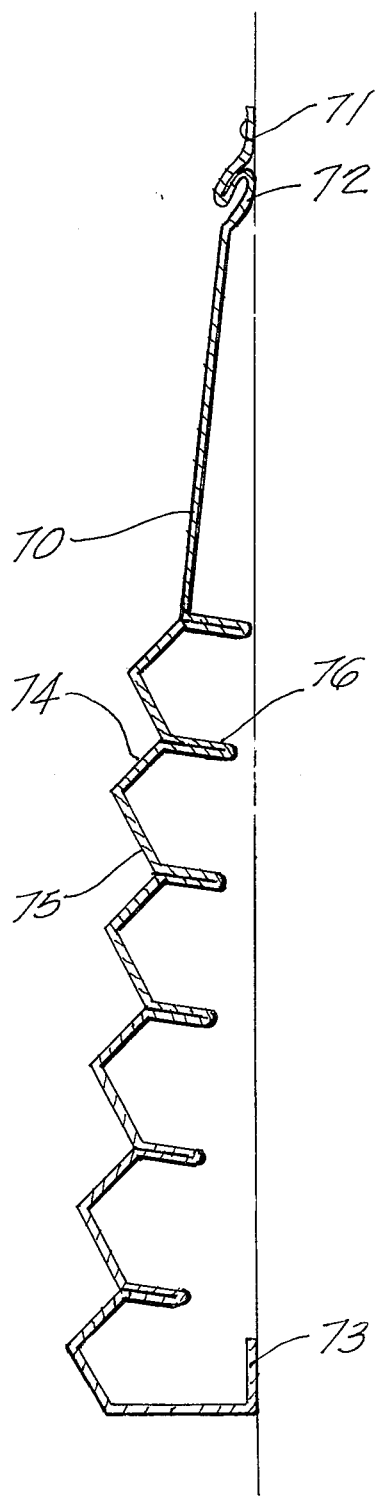
FIG. 10 is a view similar to FIG. 9 showing another modification of the solar siding elements.

Referring next to FIG. 10, another modified solar element is illustrated. In this form, the entire solar siding element 70 is formed of a single piece of sheet metal having its upper margin provided with a nailing portion 71 and a hook portion 72 for receiving an upturned flange 73 at the bottom of a next succeeding like siding element thereabove. The metal sheet is bent and formed so that the outwardly exposed surface areas, as indicated at 74 and 75, are increased, and fins 76 are formed integral with the siding.

Figures 11, 12, 13:
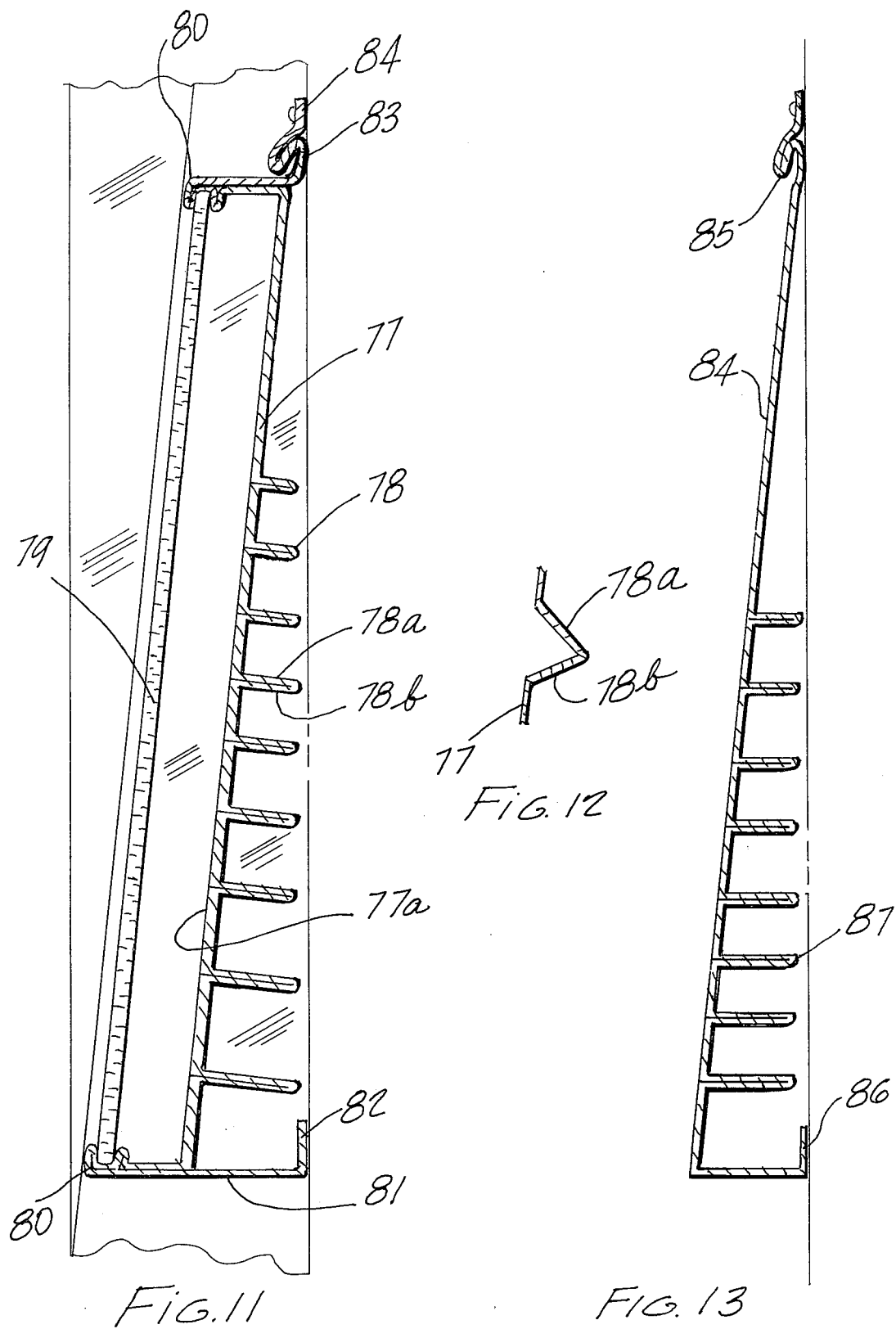
FIG. 11 is a view similar to FIG. 9 illustrating still another modification of the invention wherein the solar siding elements are provided with translucent outer glazing.
FIG. 12 is a fragmentary sectional view of a part of a solar siding element of FIG. 11, illustrating a step in forming integral fins thereon.
FIG. 13 is a view similar to FIG. 3, illustrating another modified form of a solar siding element in which the heat radiating fins are integral with the siding element.

Referring next to FIG. 11, a solar siding element 77 is illustrated. It comprises a single sheet of metal having an outer face 77a, and is folded and collapsed at intervals along its width to provide inside integral fins 78 for increasing the radiation surface thereof. This structure is easily made, as illustrated in FIG. 12, simply by pleating the sheet of material at spaced locations across its width to provide pairs of open pleat portions 78a and 78b, and then collapsing these portions of each pair into juxtaposition with each other to form the integral fins 78. This solar siding element 77 is rendered particularly desirable, and even more efficient, by providing a transparent or translucent glazing outer cover 79, of glass or plastic, disposed preferably in forwardly spaced relation to the front or outer face 77a of the siding element 77. The glazing has the advantage of changing short light waves to long heat waves. To support the glazing cover 79, the metal near the margins of the siding element 77 are folded so as to provide a framing channel structure, as indicated at 80, for receiving margins of the glass or plastic glazing 79. The extreme outer lower margin of the metal is folded back, as indicated at 81, and has its rearmost margin upturned to provide a flange 82 for fitting within a hook shaped portion 83 at the upper margin of an adjacent like solar siding element 77 therebeneath. The upper margin is folded not only to provide the hook 83, but to provide a nailing tab 84, such as described in connection with the structure of FIG. 3.

In FIG. 13, a form of solar siding element similar to that of FIG. 11 is illustrated, but without the glazing. It consists merely of a sheet of metal, indicated generally at 84, having its upper margin folded to provide a hook 85, such as described in connection with the solar siding element of FIG. 11, and having at its lower margin an upturned flange 86 or reception in the hook 85 of the succeeding like solar siding element immediately therebeneath. This siding element is provided with integral fins 87.

In FIG. 14, a solar siding element 88 is shown in which the main sheet body is crinkled or deformed slightly or superficially to provide on its forward face 88a, greater surface areas for greater radiation exposure, and greater heat radiating surface on its rear face 88b. The inner or rear of the face 88b may be textured by superficial roughening, as by forming the sheet with dies having superficially roughened forming surfaces, or otherwise.

FIG. 15 illustrates a solar siding element 89, corresponding at its upper and lower margins with the solar siding element 3, but of which the metal between these margins is folded inwardly to provide tubular portions 90, instead of the flat fins. These tubular portions are substantially peripherally continuous in cross section and may be sealed about their peripheries to provide tubes or conduits, or suitable tubes 91 may be folded within the portions 90 in intimate heat transfer relationship therewith. Thus, in addition to permitting the heated air to pass between the solar siding element 89 and the building side wall, this form also permits the use of liquid in the tubes 91 for heat exchange and transfer. This liquid may be caused to flow through the tubes, by providing a pump and conventional inlet and outlet manifolds at the opposite ends of the tubes, or by sloping the tubes from one end to the other. Again, the tubes may be closed at their ends so that the liquid in the tubes acts as a stationary heat sink.

In FIG. 16, a solar siding element 92 is shown which, at its upper and lower margins, conforms to the like margins of the solar siding element 3. A heat exchange augmenting component 93 having a front face plate 94, is disposed within, and forms a part of, the siding element 92. The component 93 has a rear face plate 95 spaced rearwardly from the front face plate 94. Fins 96, integral with the front face plate 94, extend rearwardly therefrom and pass through, and are secured by welding to, the plate 95. The plate 95, in turn, can be fastened to the wall of the building. The other portion of the solar siding element 92 may have an upturned flange 98, a hook portion 99, and a nailing tab 100 by which it can be fastened to a building wall and to the plate 95, as diagrammtically indicated.

The spaces between the inner face of the front portion of the solar siding element 92 and the forward face or the component 93 forwardly of the plate 95, and the spaces between the plate 95 and the fins 96 forwardly of the plate 95, are all filled with suitable high thermal absorbing pellets 101, such, for example, as sodium sulfate decahydrate, which has heat storage capacity several times that of rocks. However, enough space is permitted at the rear of the plate 95 to permit air flow into contact with the portions of the fins 96 exposed rearwardly of the plate 95. The plate 95 may be secured to furring strips, indicated at 102, which are spaced from each other vertically so as to leave air passages 103 between each plate 95 and the associated side wall. Thus, a heat sink is provided directly in the siding element 92 and can supersede or supplement a heat sink, such as 18, heretofore described.

In FIG. 17, there is illustrated a solar siding element 104 which is essentially the same as the siding element of FIG. 13, except that, on its forward face, it carries a container 105, as indicated, for containing liquid. The container 105 has a front wall 106. This container may be sealed so as to provide a heat sink for storing heat for resultant more gradual discharge or transfer of the heat into fins 107 on the inner or rear face of the siding element 104. The wall 106 of the container may be metal, as illustrated, or glazing.

From the foregoing disclosure, it is apparent that a solar heating system is provided which can be installed readily and at low cost by the home owner or usual building artisans, and of which the component solar elements can be produced at low cost by conventional machines and techniques of manufacture. Furthermore, the system makes use of a much greater proportion of the solar radiation to which the building is exposed than do prior systems.

Having thus described my invention, I claim:

1. In combination, a building having an upright exterior side wall with an upright outer face;
   solar elements, each in the form of an elongated siding strip of heat conducting sheet material having lateral margins and secured to the wall at the outer face thereof with adjacent lateral margins of adjacent strips in overlapping relation to each other, and, in assembled array on the wall, providing a solar cover which extends endwise of the strips from one margin of the wall to the opposite margin of the wall;
   each strip having a show portion between its said lateral margins and which is positioned so as to be spaced outwardly from the outer face of the wall when the strip margins are connected to said wall, thereby to provide space for passage of air, endwise of the strips, between the cover and said outer face of the wall from said one margin of the wall to said opposite margin of the wall;
   an inlet manifold at said one margin of the wall and having outlet means in communication with said space between said cover and outer face of the wall;
   an outlet manifold at the opposite margin of the wall and having inlet means in communication with said space;
   said inlet manifold having air inlet means for admission of air thereinto for delivery through said space; and said outlet manifold having air outlet means connectable to the interior of the building.

2. The structure according to claim 1 wherein said air inlet means of the inlet manifold include air inlet control means for connecting the air inlet means of the inlet manifold to the interior of the building and to the outside atmosphere, selectively.

3. The structure according to claim 2 wherein said air inlet control means of the inlet manifold include adjustable means for connecting the air inlet means of the inlet manifold to both the interior of the building and to the outside air, concurrently and selectively, and for admixing in selected proportions, the outside air and air from the interior of the building delivered to the air inlet means of the inlet manifold.

4. The structure according to claim 1 wherein means are provided for connecting the outlet manifold to the outside atmosphere and disconnecting it from the interior of the building, selectively.

5. The structure according to claim 1 wherein the exterior wall has a window opening and a casement therein which would normally block the passage of air between the wall and the outer strips aligned endwise with the casement; and supplemental manifolds are carried by the wall and are arranged to receive air from the portion of said space which is aligned, endwise of the strips, with the casement and to by-pass the air therefrom around the casement for delivery to the portion of said space therebeyond and thereby to the outlet manifold.

6. The structure according to claim 1 wherein the siding strips, when installed, extend horizontally along said outer face of the wall, the show portion between said lateral margins of each strip slopes outwardly of the wall downwardly from the upper margin to the lower margin of the strip, thereby providing air passage space between each show area and the wall, and providing an exterior appearance of a wall covered by conventional lap siding.

7. The structure according to claim 6 wherein each strip has, at one lateral margin, a nailing portion for receiving nails at spaced intervals along the length of the strip for nailing the strip to the wall with said one margin juxtaposed against the outer face of the wall; and each strip has at said one margin another portion in the form of a downwardly opening hook at the outer face of the strip and extending lengthwise of the strip;

the opposite margin of each strip has an upturned portion rearwardly from the outer face of the strip and receivable in the downwardly opening hook of an immediately adjacent strip thereunder for securing the lower margin in fixed position relative to the wall.

8. The structure according to claim 7 wherein the open hook of the upper margin is above the show portion, and spaced downwardly from the upper edge of the strip.

9. The structure according to claim 7 wherein the laterally outermost portion of the lower margin of each strip is in the form of an upturned flange which is receivable in the hook of a like strip installed immediately therebeneath.

* * * * *